May 31, 1955  A. E. REEVES  2,709,391
MOTION PICTURE CAMERA WITH TWO VIEW FINDERS
Filed June 29, 1953  2 Sheets-Sheet 1

ARTHUR E. REEVES,
INVENTOR.

BY John Flann
ATTORNEY.

May 31, 1955

A. E. REEVES 2,709,391

MOTION PICTURE CAMERA WITH TWO VIEW FINDERS

Filed June 29, 1953

ARTHUR E. REEVES,
INVENTOR.

BY John Hann
ATTORNEY

United States Patent Office 2,709,391
Patented May 31, 1955

2,709,391

MOTION PICTURE CAMERA WITH TWO VIEW FINDERS

Arthur E. Reeves, Los Angeles, Calif.; Robert Gordon Nichols, executor of said Arthur E. Reeves, deceased Application June 29, 1953, Serial No. 364,880

3 Claims. (Cl. 88—16)

This invention relates to cameras, and particularly to a view finder for a motion picture camera.

It is an object of this invention to provide a view finder for a motion picture camera to enable remote viewing of the precise scene being photographed by the motion picture camera. For this purpose, use is made of a small television camera and an optical system for splitting the incident beams and appropriately directing the components respectively to the television camera and the motion picture camera.

It is another object of this invention to provide a device of this character that is simple in construction.

It is another object of this invention to provide a device of this character in which a direct view finder can be optionally inserted to permit initial orientation of the motion picture camera by the operator.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Figure 1:
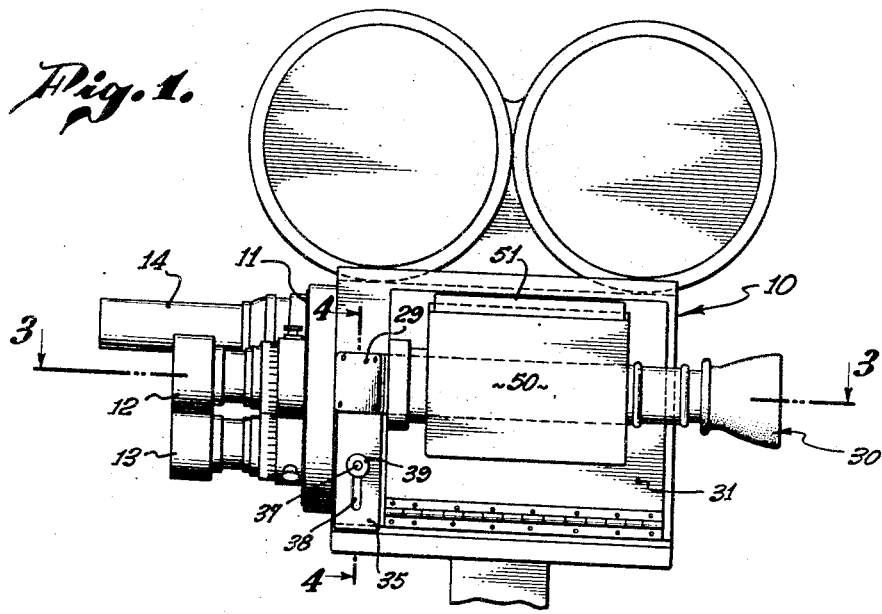
Figure 1 is a side elevation of a camera incorporating the present invention.

A motion picture camera frame 10 carries a lens turret 11 upon which is mounted a series of lens assemblies 12, 13 and 14. One of the lens assemblies 12 is shown in alignment with a camera aperture 15 past which the film 16 passes for exposure.

A gate structure 17 and intermittent mechanisms (not shown) properly control the passage and exposure of the film 16.

The film aperture 15 is provided in an intermediate wall 18 which defines a recess 19 of the camera housing 10.

The incident beams, such as 22, are partially reflected and partially refracted, so that the reflected beams, for instance, can be availed of for view finding purposes at the same time that the refracted ray, for instance, exposes the film 16. By the use of such arrangement, the view finding image corresponds precisely to the exposure made on the film 16, as the identical set of beams is used both for view finding and for film exposure.

To split the incident beams, two right-angle isosceles prisms 20 and 21 are accommodated in the recess 19 and interposed in the path of the incident beams. These prisms 20 and 21 have their oblique surfaces 20a and 21a in engagement with each other.

The prisms 20 and 21 are received in a hollow support 23 which, in turn, is received into the camera recess 19 through a guiding lateral opening 24 of the camera housing 10. The support 23 has front and rear windows 25 and 26 exposing corresponding right-angle surfaces 21b and 20b for passage of the beam 22.

The incident beam 22 passes through the window 25 and into the prism 21 through the normal surface 21b thereof. The oblique surface 21a of the prism 21 reflects a portion of the incident beam 22 laterally of the camera 10 and axially of the support 23. Such reflected beam is indicated by the reference character 27.

A portion of the incident beam 22 passes beyond the interface between the oblique surfaces 21a and 20a, through the normal surface 20b of the prism 20, through the rear window 26 of the support 23, through the camera aperture 15. Such refracted beam is indicated by the line 28.

Accordingly, the incident beams such as 22 are split into two components such as 27 and 28, which are identical except as to relative intensity.

The reflected beams such as 27 serve for view finding purposes; and the refracted beam 28 serves to expose the film 16.

The reflected beam 27 passes longitudinally of a tube 29 that extends in alignment with the support 23 and laterally of the camera 10.

Two view finders, one an optical view finder 30 and the other an electronic view finder or television camera 50, are optionally operable.

The optical view finder 30 is secured to a side door 31 of the camera, and serves as a means for forming an image of the reflected beams. For properly directing the reflected beams to the optical view finder 30, a reflecting prism 32 is interposed in the path of the reflected beam 27 in the tube 29.

The reflecting prism 32 is supported in a movable frame 33 (Fig. 4) which comprises triangularly arranged window elements secured together and to a movable support 34. The frame 33 projects through a guiding aperture 49 in the bottom of the tube 29. The support 34 is slidable along a bracket 35 which is, in turn, carried on the lower side of the tube 29. The support 34 is movable along the guide 35 selectively to move the reflecting prism 32 into or out of operative relationship with respect to the reflected beam 27.

To facilitate operation of the slide or support 34 along the guide 35, as well as to make it possible to hold the slide 34 in adjusted position, use is made of a rod 36. This rod 36 has a threaded extension 37 by the aid of which it may be attached to the slide 34. The rod 36 extends through a narrow slot 38 in the guide 35.

The rod 36 is provided with another threaded extension which is engaged by a thumb nut 39. The thumb nut 39 serves as a handle for moving the slide 34, and it may be used to tighten the slide 34 in any position against the slotted guide 35 and thus ensure precise alignment of the reflecting prism 32.

Provisions are made releasably to retain the slide 34 in either of its two positions by resilient means. Ball detents 40 and 41 are movable within appropriate cylindrical recesses 42 and 43 in the slide 34. They are urged toward the right by compression springs 44 and 45 and against the surface of the guide 35.

The surface of the guide 35 is provided with two shallow recesses, such as 46 and 47, into which the ball detents 40 and 41 may project when they are in alignment therewith.

Figure 4:
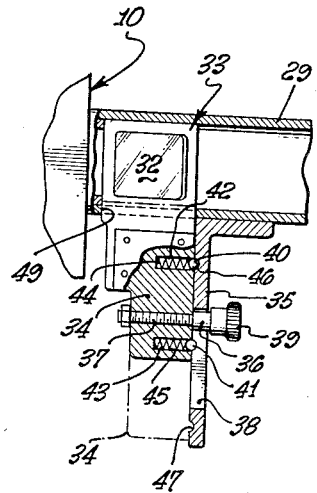
Fig. 4 is a fragmentary sectional view, taken along the plane indicated by line 4—4 of Fig. 1.

In the position of the slide 34 illustrated in Fig. 4, the reflecting prism 32 is in operative position. In this position, the upper ball detent 40 engages the recess 46 of the guide 35. In the lower position of the slide 34, in which the prism 32 is out of operative position, the lower ball detent 41 engages the recess 47 of the guide 35. The ball detents 40 and 41 thus releasably restrain movement of the slide 34 and reflecting prism 32 from adjusted position.

The thumb nut 39 can also be operated to secure the slide 34 in place.

When the optical view finder 30 is inoperative by moving the reflecting prism 32 out of operative position, the beam 27 passes unreflected to the end of the tube 29.

Figure 2:
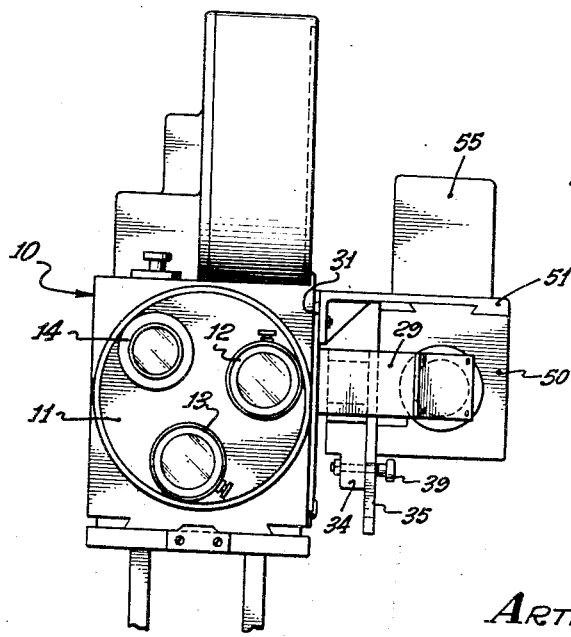
Fig. 2 is a front elevation of the camera shown in Fig. 1.
Figure 3:
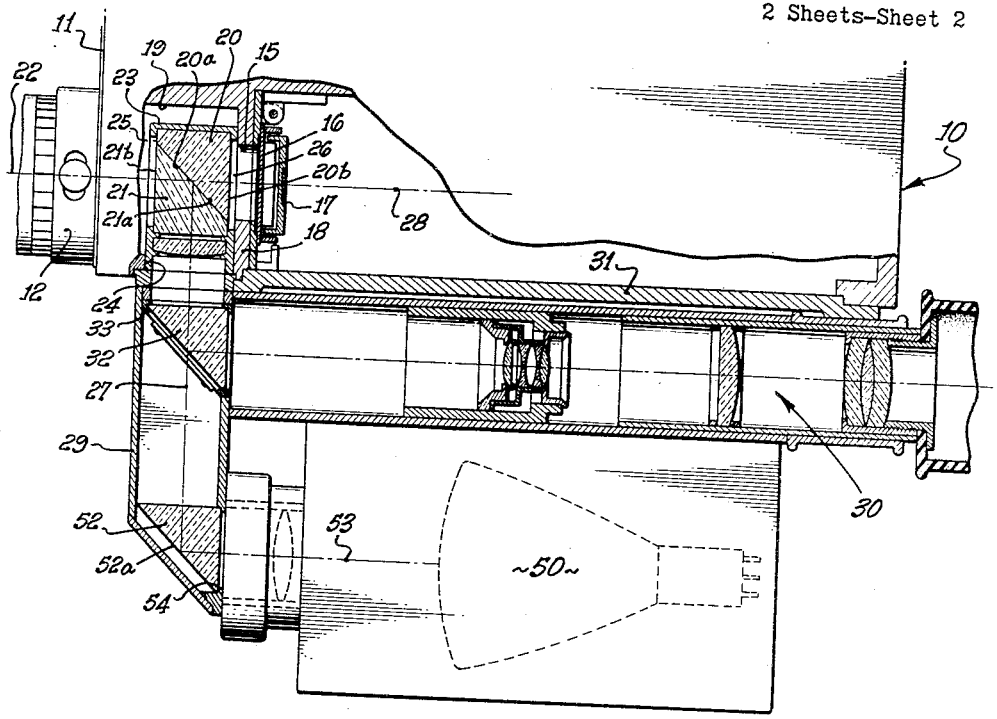
Fig. 3 is a fragmentary sectional view, taken along the plane indicated by line 3—3 of Fig. 1.

In order to make it possible to provide remote viewing of the image, use is made of the television camera 50 mounted on the camera housing 10. The television camera 50 is in dovetail engagement with a bracket 51 secured to the camera door 31 (Fig. 2). The reflected beams such as 27, which are identical with the refracted beams such as 28, are received by the television camera 50. For properly directing the beams into the television camera 50, a reflecting right-angle prism 52 is rigidly mounted at the end of the tube 29.

The beam 27 is thus again reflected as at 53 by the oblique surface 52a of the prism 52 and past a lateral aperture 54 of the tube 29. The television camera 50 thus transmits the image that may be simultaneously formed on the film 16 of the motion picture camera. Electronic means can be availed of to enhance the apparent intensity of the beams so that the reflected beams such as 27 need not detract materially from the intensity of the beams exposing the film.

A television viewer or monitor 55, in the form of a television receiver, may also be provided for the camera operator. The viewer is mounted on top of the bracket 51 and serves as a view finder when the television camera 50 is operative. The television camera 50 is operative when the optical view finder 30 is inoperative by moving the reflecting prism 32 out of the tube 29.

The inventor claims:

1. In a device of the character described: a camera frame; means for admitting incident beams into the frame; an optical device interposed in the path of said incident beams for splitting said incident beams into two angularly spaced components; means cooperating with one of said components for passing said one component to a photosensitive recording surface; an optical and an electronic view finder selectively cooperable with the other of said components; and a movably mounted reflecting member movable to two positions, said reflecting member in one position directing said other of said components to one of said view finders, said reflecting member in the other position permitting passage of said other of said components to the other of said view finders.

2. In a device of the character described: a camera frame; a lens structure for admitting incident beams into the camera frame; a tubular member projecting into and carried by the frame; a partially reflecting and partially refracting device for splitting said incident beams into two angularly spaced components, said device being interposed in the path of said incident beams, said device directing one of said components substantially axially of said tubular member; an optical and an electronic view finder mounted in side-by-side relationship on said frame and cooperating respectively with longitudinally spaced lateral openings of said tubular member; a fixedly mounted first reflecting member for directing said component into one of said apertures; and a movably mounted second reflecting member selectively positionable into and out of said tubular member for optionally directing said component into the other of said apertures.

3. In a device of the character described: a camera frame; a lens structure for admitting incident beams into the camera frame; a tubular member carried by the camera frame, said tubular member extending normal to the axis of said lens structure and laterally of said frame; said tubular member having a pair of spaced lateral openings; a partially reflecting and a partially refracting device interposed in the path of said incident beams for splitting said incident beams into two components, said device directing one of said components substantially axially of said tubular member; an optical and an electronic view finder; the optical view finder being carried by the frame and having an axis normal to said tubular member for cooperation with one of said openings; a bracket carried by said frame for supporting said electronic view finder in side-by-side relationship with said optical view finder for cooperation with the other of said openings and with the axis of said electronic view finder parallel to the axis of said optical view finder; a fixedly mounted first reflecting member for directing said one of said components through said other opening; a second reflecting member; means for supporting said second reflecting member for movement into or out of the path of said one component in said tubular member, said second reflecting member, when in the path of said one component, directing said one component through said one opening for cooperation with said optical view finder.

References Cited in the file of this patent

UNITED STATES PATENTS

| 2,282,045 | Fleischer | May 5, 1942 |
| 2,420,197 | Rosenthal | May 6, 1947 |

FOREIGN PATENTS

| 238,156 | Switzerland | June 30, 1945 |
| 985,758 | France | Mar. 14, 1951 |